Feb. 23, 1971  H. I. STANBACK ET AL  3,566,331
ELECTRICAL DISTRIBUTION SYSTEM
Filed Oct. 21, 1968  5 Sheets-Sheet 1
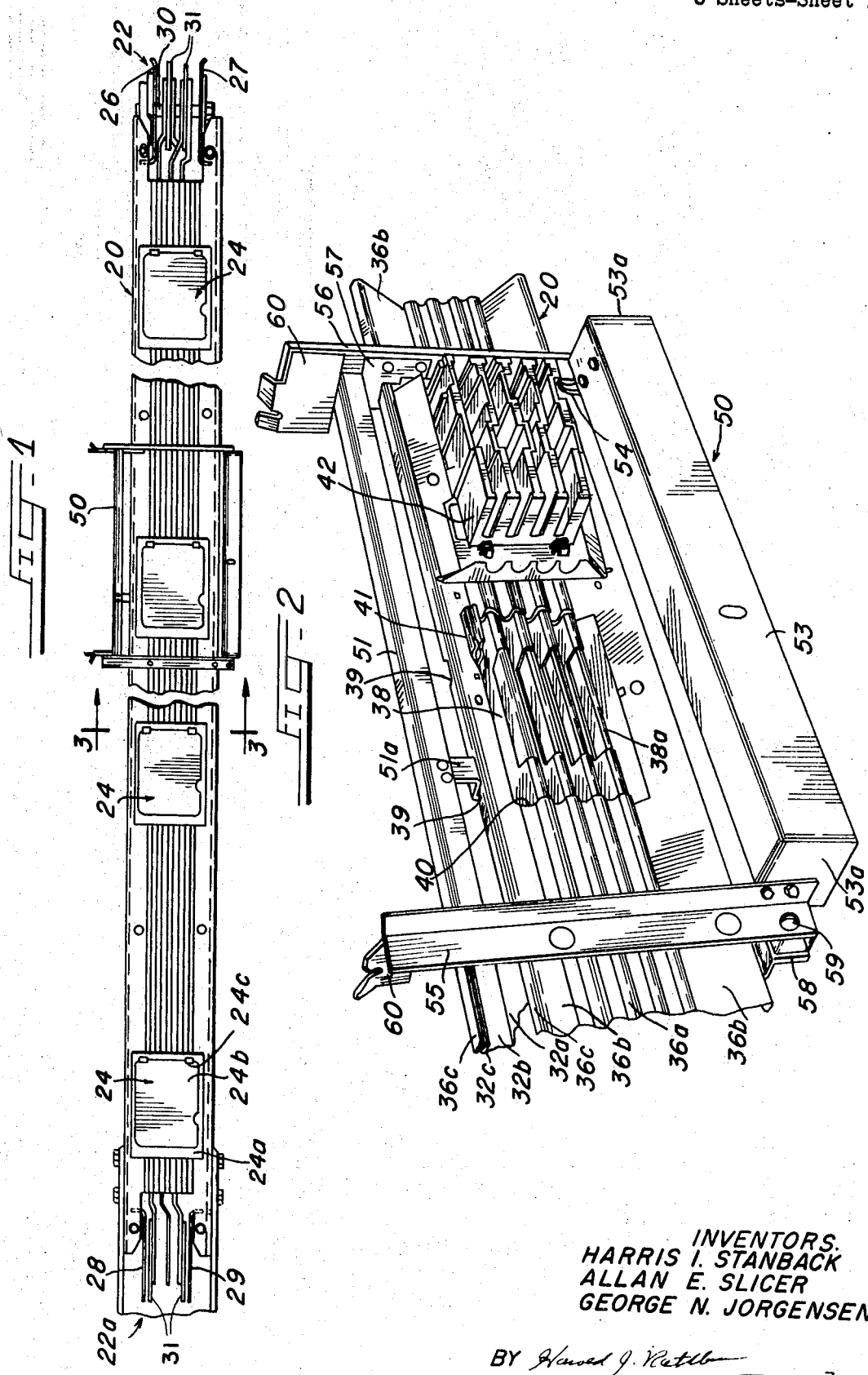
INVENTORS.
HARRIS I. STANBACK
ALLAN E. SLICER
GEORGE N. JORGENSEN

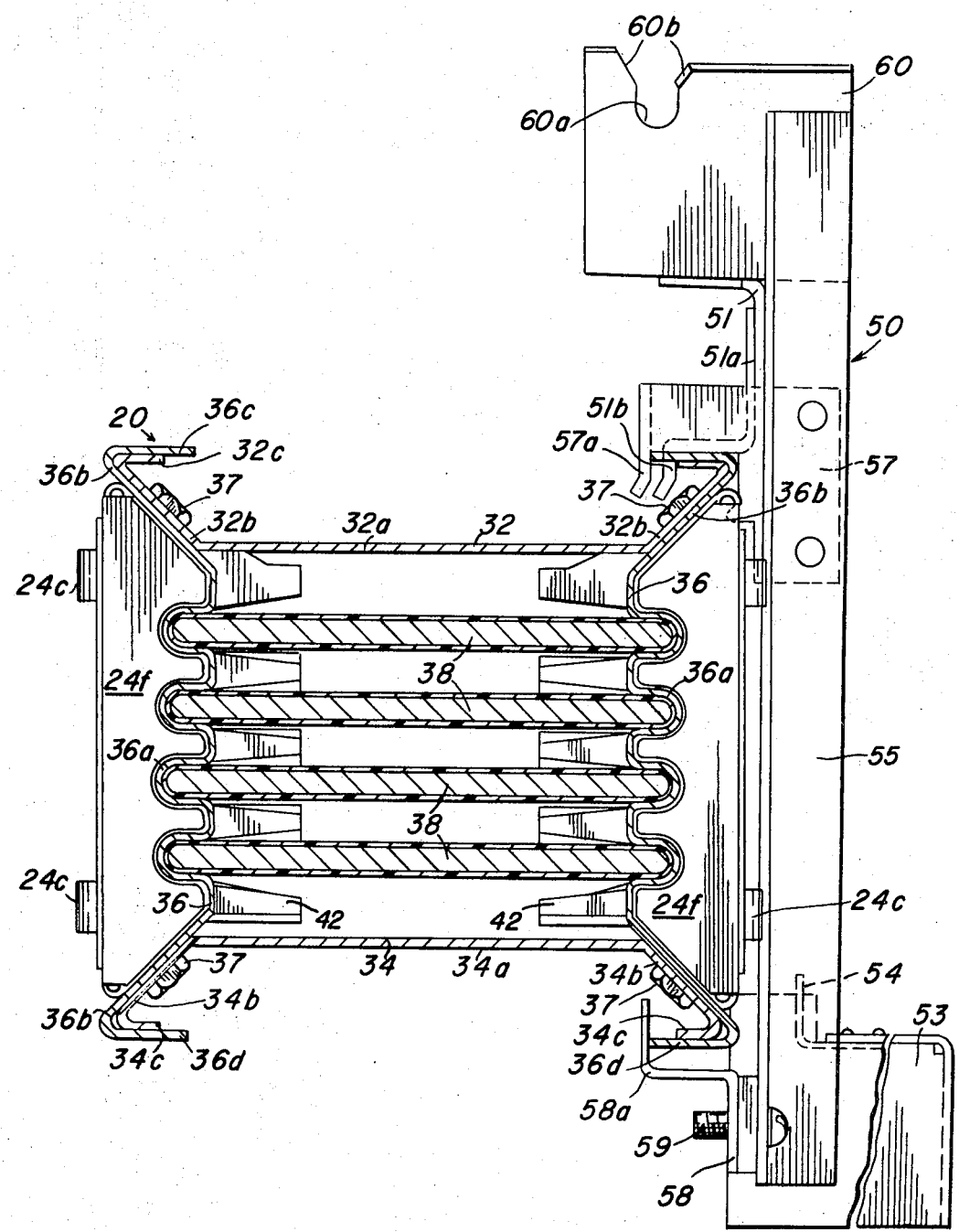

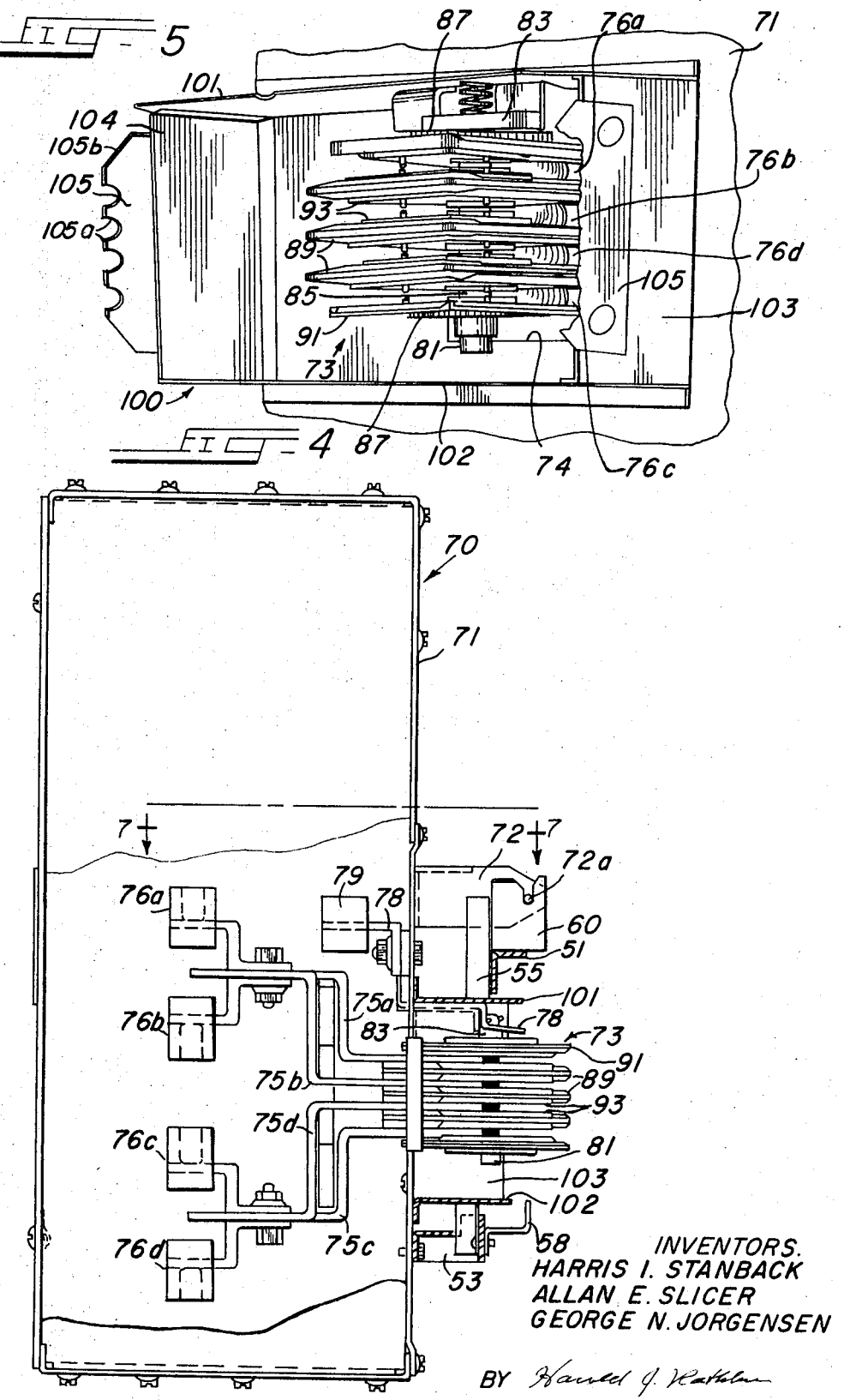

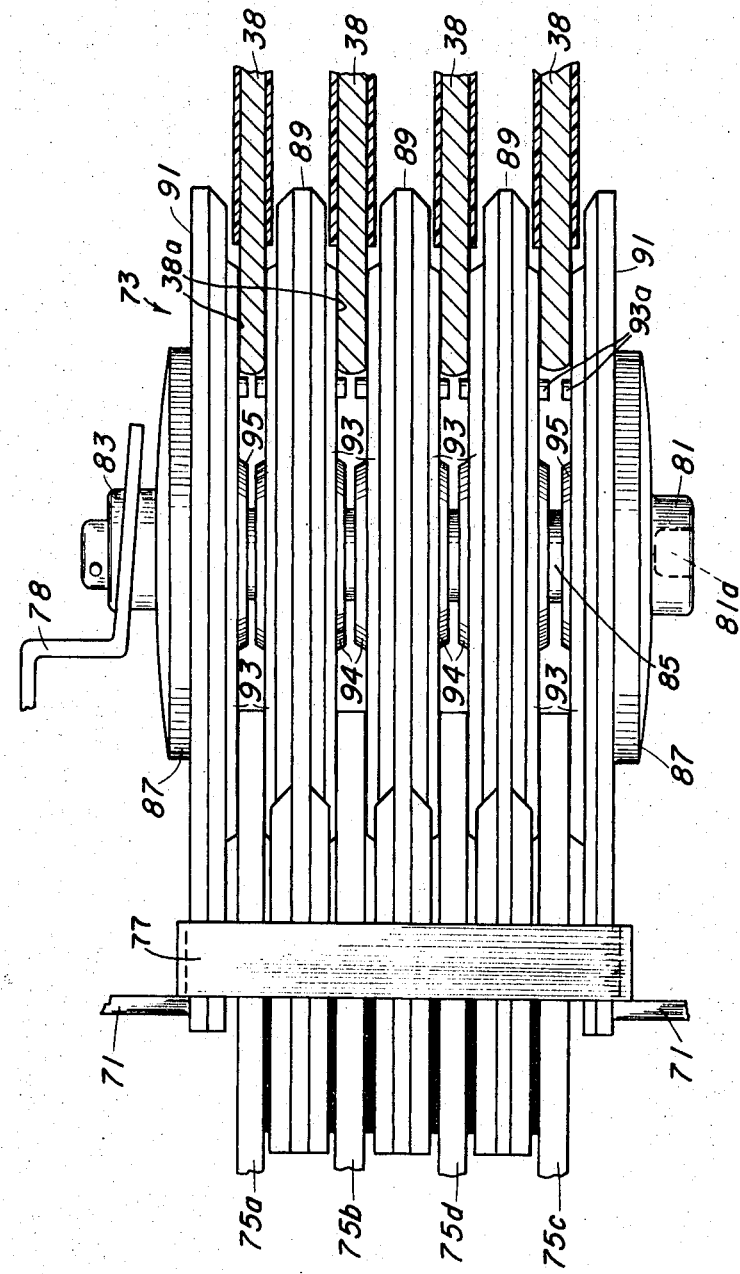

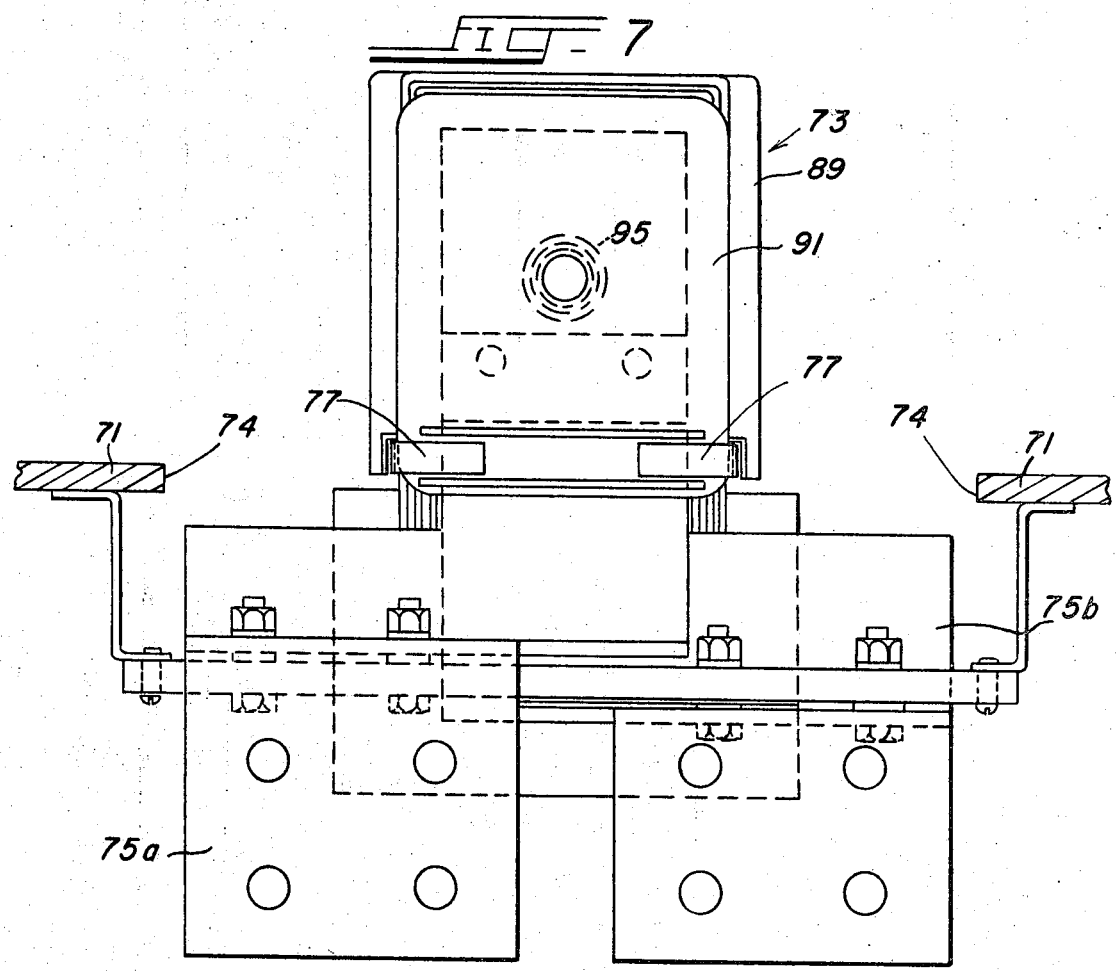
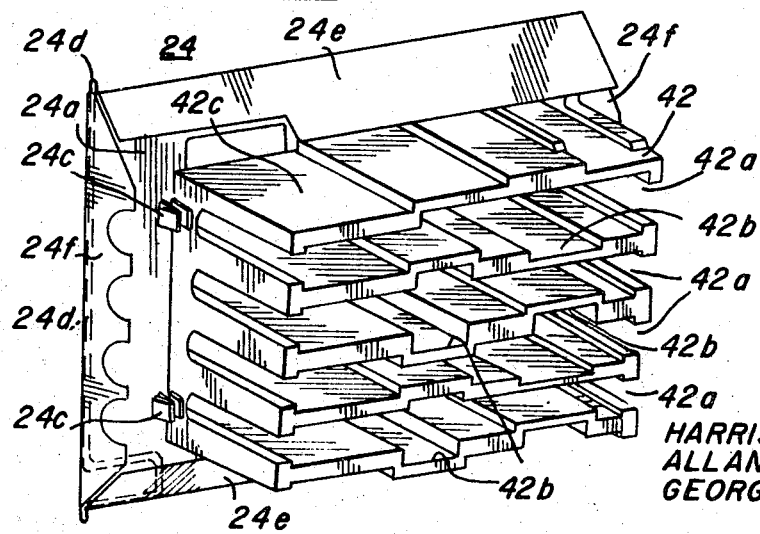

United States Patent Office 3,566,331
Patented Feb. 23, 1971

3,566,331
ELECTRICAL DISTRIBUTION SYSTEM
Harris I. Stanbeck, Allan E. Slicer, and George N. Jorgensen, Lexington, Ky., assignors to Square D Company, Park Ridge, Ill., a corporation of Michigan
Filed Oct. 21, 1968, Ser. No. 769,070
Int. Cl. H01r 3/00, 7/00; H02g 5/00
U.S. Cl. 339—22                                    9 Claims

ABSTRACT OF THE DISCLOSURE

A section of the duct has a housing of rectangular cross section containing a plurality of flatwise-stacked power bus bars and having recurring access openings in opposite side walls each of which permits either a lower-current plug-in unit or a higher current tap-off unit to be selectively connected therethrough to the bus bars. Hood and door assemblies are pivoted on the housing at the respective access openings and each covers its associated access opening when in closed position. An insulator, secured to the inner side of each hood, has a plurality of relatively small openings providing access to the bus bars by jaws of a low-current plug-in unit when the door is open. When each assembly is in its open position, the insulator secured to the hood thereof is removed from the bus bars to uncover a relatively large contact area on each bus bar. A generally rectangular mounting frame may be releasably attached to the housing at each of selected ones of the access openings, and a high-current tap-off unit may be removably attached to each mounting frame. Each tap-off unit has a joint structure which, when the associated hood member is in its open position, can extend through the associated access opening and interleave with the relatively large contact areas on the bus bars. Jaws of ground bus bar connector extend through the respective access openings for selective engagement with a grounding blade of the plug-in and tap-off units.

---

This invention relates generally to sectionalized plug-in bus duct, and more particularly to a plug-in bus duct section the housing of which has recurring access openings along its opposite side walls which selectively accommodate plug-in units and tap-off units of relatively small and relatively large current capacity, respectively.

The present invention is an improvement over the bus duct disclosed in U.S. Pat. No. 3,384,855, issued May 21, 1968, to which reference may be had for a more detailed description of common features.

Although the bus duct of the above-mentioned patent represents a significant contribution to the art, the size limitations of the access openings in the side walls of the housing limit the current available at any one opening with which to meet load requirements. The structure of the prior bus duct is advantageous, however, in that it provides recurring access openings in a housing permitting accessibility to power bus bars for plug-in connections at numerous locations thus permitting flexibility in original layout and subsequent alterations of the locations of electrical loads.

It is desirable to provide a plug-in bus duct of serially-connected sections which offers the foregoing flexibility and which can meet the various power requirements of electrical loads whenever and wherever installed. However, as individual load requirements surpass the maximum current available from a single access opening, the utility of the busway diminishes. Typically, a plug-in unit, such as disclosed in U.S. Pat. No. 3,339,038, issued Aug. 29, 1967, has the capacity to tap only a maximum of 400 to 600 amperes from a single access opening because of the size limitations of the opening. Certain applications require as much as twice that amount of current to be supplied to a single load such as a large welder or punch press. With the present invention, it is possible to install a tap-off unit of such current rating at any access opening without substantially enlarging the access opening or materially altering the structure of the bus duct.

Since the locations of the high-current loads are not always foreseeable in advance of the installation of a duct run, it is desirable to provide a flexible high-current tap-off arrangement. Also, because higher-current load requirements exist together with lower-current load requirements, the duct structure should have both capabilities so that either a lower-current plug-in unit or a higher-current tap-off unit may be installed at any single access opening.

Some prior busways provide for adding relatively high-current tap-off devices to the duct run; however, in each case, they have serious shortcomings in comparison with a busway in accordance with the present invention. For example, one prior busway permits the adding of a high-current tap-off unit only at joint structures between two bus duct sections. This has the disadvantage that only one tap-off unit can be installed for each duct section and then only at a joint, and the installation requires the disassembly and re-assembly of many small parts. This is, of course, time-consuming and is also subject to installation errors and resulting delays. Another prior structure requires that a special adaptor duct section be installed wherever it is anticipated that a high-current tap-off unit might be needed in the future. This has the obvious disadvantage of requiring the use of many adaptor sections in order to provide a flexible system. This design also permits only one tap-off unit to be used for each duct section.

A plug-in bus duct section constructed in accordance with the present invention has an elongated housing of generally rectangular cross section including at least a pair of opposite side walls each having longitudinally recurring access openings spaced therealong. The housing contains a plurality of flatwise-stacked parallel-spaced insulated power bus bars each positioned with its opposite longitudinally extending edge faces adjacent the respective opposite side walls and having relatively large uninsulated and exposed surface areas accessible at the respective access openings. Complementary joint structures are provided at the ends of the housing for serially connecting the power bus bars of like bus duct sections.

A hood and door assembly, when in a closed position, covers each of the openings and is pivoted to swing to an open position lengthwise of the bus duct housing, thus providing access to the relatively large exposed surface areas on the power bus bars. The hood and door assembly has a hood member and a door. The door is pivotably mounted on the hood member so as to swing to an open position while the hood member is in a closed position. An insulator is secured to the inner side of the hood member and has a plurality of relatively small openings extending therethrough aligned with the large exposed areas of the respective power bus bars when the hood member is in the closed position, thus providing access to relatively small exposed surface areas on the respective power bus bars when the door is in the open position and the hood member is in the closed position.

A generally rectangular mounting frame is removably attachable to the bus duct housing at any selected one of the access openings. When the hood and door assembly of the selected opening is pivoted to its open position, a high-current tap-off unit, having a joint structure similar to the complementary joint structures at the ends of the housing, may then be attached to the mounting frame and the joint structure of the tap-off unit interleaved with the relatively large exposed areas of the power bus bars.

An object of the invention is to provide an improved plug-in bus duct section capable of selectively receiving both low-current plug-in units and high-current tap-off units at spaced locations along its length.

Another object is to provide a plug-in bus duct section having an improved hood and door assembly which provides access selectively to a relatively large or a relatively small exposed surface area on the power bus bars to permit a high-current tap-off device or a low-current plug-in unit to be connected thereto.

A further object is to provide an improved bus duct arranged to permit ready removal of insulators from about the relatively large exposed areas of the power bus bars for the connection of a high-current tap-off device by securing the insulators at the plug-in openings onto a pivoted hood and door assembly.

Still another object is to provide an improved mounting means for attaching a relatively large and heavy tap-off unit to a bus duct housing at a selected plug-in opening.

Yet another object is to provide a high-current tap-off unit having a joint structure arranged to be connected to flatwise-stacked parallel-spaced bus bars of a plug-in bus duct section.

Further objects and advantages will become apparent from the following description wherein reference is made to the drawings, to which:

FIG. 1 is an elevational side view of a plug-in bus duct section and mounting frame for a tap-off unit constructed in accordance with this invention with an intermediate portion of the section broken away;

FIG. 2 is an enlarged perspective view of a fragmentary portion of the duct section of FIG. 1 shown as including four power bus bars instead of only three as in FIG. 1, with a hood and door assembly in open position, and with a mounting frame in position;

FIG. 3 is a sectional view taken generally along the line 3—3 of FIG. 1, but including four bus bars;

FIG. 4 is a side view of a tap-off unit in accordance with this invention, with a portion of its enclosure broken away, and shown mounted on the mounting frame of FIGS. 1, 2 and 3;

FIG. 5 is a front perspective view of a fragmentary section of the tap-off unit of FIG. 4 showing the joint structure and its isolating enclosure, part of one of two attachment plates being broken away;

FIG. 6 is an enlarged side view of the joint structure of the tap-off unit of FIGS. 4 and 5 and including edge portions of the power bus bars of the bus duct section of FIG. 2;

FIG. 7 is a sectional view of the tap-off unit taken generally along the line 7—7 of FIG. 4 with certain portions being removed for clearness of illustration; and FIG. 8 is a perspective view of the inner side of the hood and door assembly of FIGS. 1, 2, and 3.

Referring first to FIG. 1, a section of plug-in bus duct 20 constructed in accordance with this invention has joint structures 22 and 22a at its opposite ends, and a plurality of hood and door assemblies 24 positioned at intervals on opposite sides of a housing and fitted over recurring access openings each of which is adapted to receive selectively plug-in terminal jaws of a low-current plug-in unit (not shown) or an interleaving joint structure of a high-current tap-off unit to be later described.

The joint structure 22, shown at the right-hand end portion of the duct section 20 as viewed in FIG. 1, has a pair of upper and lower outer joint covers 26 and 27 which are secured to the housing of the section 20. Similarly, the joint structure 22a, shown at the left-hand end portion of the duct section 20, has a pair of slotted upper and lower inner joint covers 28 and 29 secured to the housing. The pair of upper and lower outer joint covers 26 and 27 carry a captive nut and bolt combination 30. Suitable insulating plates 31 are provided at each joint structure 22 and 22a, and it will be understood that a joint structure such as 22a of another duct section 20 may be interleaved with a joint structure 22 to form a completed joint between two serially-connected sections.

As best shown in FIG. 3, the housing of the duct section 20 is formed of four pieces including a top wall 32 and a bottom wall 34, which may be substantially identical, and a pair of substantially identical side walls 36. The side walls 36 have intermediate main portions 36a which are corrugated thereby to define pairs of aligned opposing grooves which grip opposite edge portions of a plurality of insulated power bus bars 38, respectively, four of which are shown in FIG. 3 instead of three as in FIG. 1. When only three of the power bus bars 38 are required, the lowermost one may be omitted. At the location of each of the hood and door assemblies 24, the bus bars 38 have uninsulated or exposed areas 38a (FIGS. 2 and 6) along their margins.

Thus, the duct section 20 may have either three or four of the power bus bars 38, and it may also have an internally mounted ground bus bar (not shown) extending throughout the entire length of the section and into the joint structures 22 and 22a. The opposite end portions of the three power bus bars 38 of the duct section 20 as shown in FIG. 1 may be so shaped that the joint structures 22 and 22a are substantially identical to those disclosed in U.S. Pat. No. 3,189,680, issued June 15, 1965. When four of the power bus bars 38 are used, as in FIG. 3, the opposite end portions thereof may be shaped to provide joint structures substantially identical to those disclosed in U.S. Pat. No. 3,187,086, issued June 1, 1965, and when a ground bus bar is included in the duct sections, the opposite ends of the ground bus bar and the power bus bars may be shaped to provide joint structures substantially identical to those disclosed in copending U.S. patent application Ser. No. 727,275, filed May 7, 1968, now Pat. No. 3,497,860, issued Feb. 24, 1970, and assigned to the assignee of the present invention.

The top wall 32 of the housing includes an intermediate main portion 32a extending horizontally in the normal position of use of the bus duct section 20, a pair of outer flange portions 32b respectively extending upwardly and outwardly substantially at forty-five degree angles from opposite sides of the intermediate main portion 32a, and a pair of inwardly-extending edge portions 32c respectively extending toward each other from the outer flange portions 32b substantially parallel to the intermediate main portion 32a. The bottom wall 34 includes an intermediate main portion 34a, a pair of outer flange portions 34b, and a pair of inwardly-extending edge portions 34c corresponding respectively to the intermediate main portion 32a, outer flange portions 32b, and inwardly-extending edge portions 32c of the top wall 32, the outer flange portions 34b extending downwardly and outwardly substantially at forty-five degree angles from opposite sides of the main portion 34a, respectively.

In addition to the corrugated intermediate main portion 36a, each side wall 36 has a pair of opposite flange portions 36b, an upper flange portion 36b and a lower flange portion 36b extending upwardly and outwardly and downwardly and outwardly, respectively, parallel to and engaging the outer flange portions 32b and 34b, respectively. Each side wall 36 also has upper inwardly-extending edge portions 36c and lower inwardly-extending edge portions 36d engaging and overlapping the inwardly-extending edge portions 32c and 34c, respectively. The upper and lower flange portions 36b are secured to the respective outer flange portions 32b and 34b of the top and bottom walls 32 and 34 by a plurality of longitudinally-spaced screws 37.

Each of the upper edge portions 36c of the side walls 36 is provided with a plurality of longitudinally-spaced pairs of notches 39, one pair of which is shown in FIG. 2, for positioning low-current plug-in units in a manner well known in the art and high-current tap-off units as will be described. One of the hood and door assemblies 24 is disposed between the notches 39 of each pair; and, as can be seen in FIG. 2, the corrugated intermediate main portions 36a of both of the side walls 36 are cut away between the notches 39 of each pair to form access openings 40 each of which is covered by one of the hood and door assemblies 24. When a low-current plug-in unit, such as disclosed in the above-identified U.S. Pat. No. 3,339,038, is removably attached to the housing of the duct section 20 over a selected one of the recurring access openings 40, the plug-in unit has a pair of hook-like brackets having hook portions, respectively, which are received within the pair of notches 39 associated with any single recurring access opening as shown, for example, in U.S. Pat. No. 3,384,854, issued May 21, 1968.

The access openings 40 in the side walls 36 respectively receive protective molded insulators 42, one of which is best shown in FIG. 8. One of the insulators 42 is secured on an inner side face of each of the hood and door assemblies 24. The inner portion of each insulator 42 is provided with a plurality of longitudinally-extending grooves 42a within which the edge faces of the power bus bars 38, about the exposed areas 38a thereof, are respectively received when the associated one of the hood and door assemblies 24 is in the fully closed position. Each insulator 42 is also provided with a plurality of transverse openings 42b extending from the outer side face of the insulator 42 and communicating respectively with the recesses 42a, the openings 42b being adapted to receive plug-in terminal jaws of one of the low-current plug-in units (not shown). Further, each insulator 42 has a notch 42c in its upper surface so that, when a ground bus is included in the duct section 20, access is provided to an associated ground connector jaw 41 (FIG. 2). A jaw 41 is secured to the ground bus at each access opening, and extends outwardly from the ground bus, and lies within the notch 42c of the associated insulator 42 so that its free end portion is exposed at the outer side face of the insulator 42 when the associated one of the hood and door assemblies 24 is fully closed.

Each of the hood and door assemblies 24 includes a hood member 24a and a door 24b, the hood member 24a including a front wall having a centrally disposed rectangular opening. One of the insulators 42 is secured to the inner side of the front wall in any suitable manner and is aligned to expose the openings 42b and the notch 42c through the rectangular opening in the hood member 24a. The door 24b, as shown in FIG. 1, is pivotally mounted to the outer side of the hood member 24a by a pair of hinges 24c, and covers the opening in the hood member 24a when the door is in a closed position.

The hood and door assemblies 24 are pivotally mounted on the side of the housing of the duct section 20 at the respective access openings 40 therein by means of respective pivot pins 24d. The opposite ends of each pin 24d protrude upwardly and downwardly, respectively, from an edge face of the hood member 24a to be received within respective holes in at least one flange portion of the pairs of flange portions 32b and 36b or 34b and 36b of the walls 32, 34, and 36.

Each hood member 24a further includes a plurality of flange portions extending rearwardly from the outer margins of the front wall, the flange portions comprising converging upper and lower anchoring flange portions 24e and a pair of parallel side flange portions 24f. The anchoring flange portions 24e of each assembly 24 extend generally parallel to the respective flange portions 36b of the associated side wall 36 when the assembly 24 is installed on the duct section 20. The side flange portions 24f each have inner edge faces abutting the main portions 36a and flange portions 36b of the side walls 36 adjacent the side edges of each of the associated access openings, intermediate portions of the respective inner edge faces being scalloped complementary to the shape of the corrugated intermediate main wall portions 36a and an upper portion and a lower portion of the inner edge faces being sloped so as to extend parallel to the flange portions 36b, as shown best in FIG. 3.

At least one of the screws 37, which secure the respective pairs of flange portions 32b–36b and 34b–36b together, is so positioned so as to be threadable into one of the anchoring flange portions 24e of the hood members 24a to releasably maintain the assembly 24 in the closed position.

One or more generally rectangular mounting frames 50 may be removably attached to the housing of the duct section 20 respectively over one or more selected ones of the access openings. Each mounting frame 50 is preferably constructed of steel shapes and comprises an upper cross member 51, a lower cross member 53, and two side members 55 and 56.

The upper cross member 51 has a generally L-shaped cross section and has a base portion and a leg portion. The leg portion is provided with a mounting bracket 51a having a hook-like extension 51b (FIG. 3) to provide a means for laterally positioning the mounting frame 50 with respect to the housing of the duct section 20. The etxension 51b is received in one of the notches 39 in the inwardly-extending edge portion 36c.

The lower cross member 53 is generally L-shaped and has a base portion and a leg portion with the end faces thereof closed to present opposite end surfaces 53a to which the side members 55 and 56 are respectively attached as by bolts. Adjacent the righthand end portion of the lower cross member 53, as viewed in FIG. 2, is a generally flat spring latch 54 which serves to hold the hood and door assembly 24 in an open position against the side wall 36.

The side members 55 and 56 are substantially identical, having a generally L-shaped cross section, but are reversed with respect to each other, and each has a base portion and a leg portion with the base portion of the cross member being in parallel-spaced relation to the side wall 36, and with the leg portion thereof being perpendicular to the side wall 36 when the frame 50 is in position. Two generally L-shaped mounting brackets 57 are attached to the leg portions of the side members 55, respectively. The base portion of each bracket 57 rests upon the inwardly-extending edge portion 36c with a hook-like extension 57a (FIG. 3) abutting against the inner edge face of the edge portion 36c in a similar manner to the positioning of the hook-like extension 51b, except that the extensions 57a do not fit within a notch. A pair of brackets 58 are attached respectively to the lower portion of the base portion of the side member 55 as by bolts 59, and each has a hook-like extension 58a abutting against the inner edge face of the edge portion 36d in a similar manner to the positioning of the extension 57a. The hook-like extensions 51b and 57a extend downwardly toward the main portion 32a of the top wall 32 and the hook-like extension 58a extends upwardly toward the main portion 34a of the bottom wall 34.

Secured to the upper portion of the side member 55 are a pair of generally rectangular flat brackets 60. Each bracket 60 has a bottom edge which rests on the upper cross member 51, and extends perpendicularly inwardly of the upwardly-extended plane of the main portion 36a of the side wall 36. The inner edge of the bracket 60 overlies the central portion of the main portion 32a of the top wall 32, and the inner portion of the top edge of the bracket 60 has an upwardly-facing V-shaped notch 60a having a pair of side walls 60b bent over slightly in the same direction, one of the side walls 60b bent over slightly more than the other side wall 60b, the notch 60a and the side walls 60b being used to receive and support, respectively, the supporting structure of the high-current tap-off unit as will be described.

A high-current tap-off device or unit in accordance with this invention is shown in FIGS. 4, 5, and 6 and comprises a relatively large box-like enclosure 70 having a front wall 71, provided with a pair of hanging members 72 having respective inwardly-protruding bolts 72a, and a joint structure 73. The joint structure 73 protrudes from the interior of the enclosure 70 through an opening 74 in the lower central portion of the front wall 71.

The joint structure 73 may be arranged to accommodate either the three or four power bus bar configuration of the duct section 20 and, therefore, has a corresponding number of power bus bar extensions 75 extending through the opening 74 from within the enclosure 70. The joint structure 73 is shown in FIGS. 4, 5, and 6 as arranged to accommodate four of the power bus bars 38, and therefore, four power bus bar extensions 75a, 75b, 75c, and 75d are shown which preferably are of the same thickness as the bus bars 38. Each of the power bus bar extensions 75a and 75b is offset upwardly and oppositely laterally so that their extreme internal end portions are coplanar and spaced apart as shown in FIGS. 4 and 7. Each of the power bus bar extensions 75c and 75d is offset downwardly and oppositely laterally so that their extreme internal end portions are also coplanar and spaced apart.

The power bus bar extensions 75a, 75b, 75c, and 75d carry terminal lugs 76a, 76b, 76c, and 76d, respectively, on their extreme internal end portions by which external electric conductors may be attached for supplying an electrical load. The power bus bar extensions 75a, 75b, 75c and 75d are partially held in their assembled relationship adjacent the joint structure 73 by a pair of U-shaped spring clips 77 (FIGS. 6 and 7) positioned one on each side of the joint structure 73.

When the housing of the duct section 20 is provided with the internal ground bus bar similar or like that disclosed in the above-mentioned copending application Ser. No. 727,275, now Pat. No. 3,497,860, issued Feb. 24, 1970, the enclosure 70 further includes a relatively thin ground bus bar extension 78 also extending through the opening 74 from within the enclosure 70. The ground bus bar extension 78 has one end portion positioned at the top of the joint structure 73 and shaped to be received within one of the ground connector jaws 41 (FIG. 2). Within the enclosure 70, the ground bus bar extension 78 is offset upwardly and laterally in the same manner as is power bus bar extension 75a, and carries a terminal lug 79 to which a ground conductor may be attached.

The joint structure 73 is substantially identical to the joint structure disclosed in the above-mentioned U.S. Pat. No. 3,384,854 and includes a bolt 81 and an elongated nut 83, the bolt 81 having a tool-receiving recess 81a whereby the joint structure 73 may be tightened from the bottom thereof merely by turning the bolt 81. The bolt 81 is within an insulating sleeve 85 which extends from the head of the bolt substantially all the way to the nut 83. A metal spacer (not shown) may be provided adjacent the head portion of the bolt 81 when the three power bus bar configuration of the duct section 20 is used. A pair of large spring washers 87 is provided for the joint structure 73, one of the pair of washers being adjacent the nut 83 and the other of said pair being adjacent the head portion of the bolt 81.

The joint structure includes five insulating plates disposed in alternately spaced relationship to the four power bus bar extensions 75a, 75b, 75c, and 75d, three inner insulating plates 89 being identical on opposite sides and two outer insulating plates 91 having only their inner sides identical to the sides of the inner insulating plates 89. Each inner insulating plate 89 has a pair of tie plates 93 partially recessed therein on opposite sides, and each outer insulating plate 91 has one tie plate 93 partially recessed therein on its inner side.

Each tie plate 93 is provided with a partially sheared projection 93a which extends perpendicularly outwardly of the exposed surface of the tie plate 93 so that a pair of tie plates 93 contiguous to an interleaved single power bus bar 38 presents a corresponding pair of projections 93a functioning as a means of limiting the extent of penetration of the edge portions of the power bus bars 38 into the joint structure 73.

Further, each insulating plate 89 is provided on each side with a pair of projecting concentric circular ribs including a larger outer rib 94 and a smaller inner rib (not shown). Each outer insulating plate 91 is provided only on its inner side with a pair of concentric circular ribs including a larger outer rib 95 and a smaller inner rib (not shown). Each of the outer ribs 94 and 95 projects through a hole in its associated one of the tie plates 93; and, each of the inner ribs defines the hole through which the plates 89 and 91 receive the bolt 81 and sleeve 85.

The enclosure 70 includes on its front wall 71 a generally rectangular isolating structure 100 having a top wall 101, a bottom wall 102, and a pair of side walls 103 and 104, respectively, mounted on the front wall 71 in surrounding relation to the joint structure 73. The plurality of walls of the isolating structure 100 completely enclose the joint structure 73 about the access opening 40 uncovered by the hood and door assembly 24. The joint structure 73 is positioned in the isolating structure 100 closely adjacent the side wall portion 103 so that space adjacent the wall portion 104 is available to accommodate the hood and door assembly 24 when secured in open position against the side wall 36 by the spring member 54 as previously described.

Each of the side walls 103 and 104 is provided with an attachment plate 105, which has scalloped side flange portions 105a and 105b shaped so as to conform with the intermediate main wall portion 36a and the upper and lower portions 36b of the side wall 36, respectively.

After one of the mounting frames 50 is secured over a selected one of the access openings 40 of the duct section 20, one of the high-current tap-off units 70 may be secured therein by reception of the bolts 72a within the respective notches 60a in the brackets 60 which are inwardly of the hooks 72, respectively, as shown in FIG. 4, and the isolating structure 100 is disposed within the bounds of the mounting frame 50.

What is claimed is:

1. An electrical distribution system comprising a plug-in bus duct section including an elongated housing having a side wall with an access opening therein, a plurality of flat, elongated, spaced, parallel bus bars disposed in the housing and extending longitudinally thereof with their flat sides perpendicular to the side wall, each bus bar having a relatively large uninsulated surface area aligned with the access opening so as to be accessible through, an insulator movably secured to the housing and disposable selectively in blocking and unblocking relationships with respect to the access opening, the insulator having a plurality of relatively small openings extending therethrough for respectively permitting access only to limited portions of the relatively large uninsulated surface areas of the bus bars when the insulator is in the blocking relationship, and a high-current power tap-off means mounted on the housing over the access opening with the insulator in the unblocking relationship, the power tap-off means including a joint structure extending through the access opening and electrically connected to the bus bars at the relatively large uninsulated surface areas thereof.

2. An electrical distribution system as claimed in claim 1 wherein the joint structure includes a plurality of spaced parallel tie plates and a plurality of bus bar extensions having spaced parallel end portions interleaved with and connected respectively to end portions of the tie plates, and the other end portions of the tie plates are interleaved with and connected respectively to the relatively large uninsulated surface areas of the bus bars.

3. An electrical distribution system as claimed in claim 1 wherein each of the power tap-off means and the bus duct section has a ground connector means electrically connected to the ground connector means of the other.

4. An electrical distribution system as claimed in claim 2 wherein the ground connector means of the power tap-off means is a blade-type connector, and the ground connector means of the bus duct section is a plug-in jaw member.

5. An electrical distribution system as claimed in claim 1 wherein a mounting frame is removably attached to the housing in surrounding relation to the access opening and the power tap-off means includes an enclosure removably mounted on the mounting frame.

6. An electrical distribution system as claimed in claim 5 wherein the mounting frame comprises spaced upper and lower cross members and a pair of spaced side members, each of the side members is provided with a hanging bracket having a hook portion engaging the housing for removably mounting the mounting frame on the housing, a pair of mounting brackets each including an upwardly facing notch is positioned on the mounting frame above the hanging brackets, and the power tap-off means includes means received in the notches and removably mounting the enclosure of the power tap-off means on the mounting frame.

7. An electrical distribution system as claimed in claim 6 wherein the insulator is pivotally mounted on the housing, the upper and lower cross members and the pair of side members define an area of sufficient size for the mounting frame to surround the insulator in both its blocking and unblocking relationships to the access opening, and a means is provided on the mounting frame for releasably latching the insulator in the unblocking relationship.

8. An electrical distribution system comprising a plug-in bus duct section including an elongated housing having a side wall with an access opening therein and a plurality of flat, elongated, spaced, parallel bus bars disposed in the housing and extending longitudinally thereof with their flat sides perpendicular to the side wall, and connecting means for selectively electrically connecting either of two bus duct plugs of different current ratings and different constructions to the bus bars through the access opening, one of the plugs having a relatively low current rating and having a plurality of sets of plug-on jaws pluggable respectively onto the bus bars and the other of the plugs having a relatively high current rating and having a joint structure including a plurality of tie plates and a clamping bolt for clamping the bus bars respectively to end portions of the tie plates, the connecting means including a hood pivotally connected adjacent one end to the housing and movable through substantially one hundred eighty degrees selectively into closed and open positions with respect to the access opening, the hood having an aperture therethrough, an insulator secured to the inside of the hood, the insulator filling the aperture and having a plurality of openings therethrough, and a mounting frame hangable on the housing in surrounding relationship to the access opening and elongated sufficiently to encompass the hood in its open position, the mounting frame being removed from the housing and the hood being in its closed position when it is desired to electrically connect the one plug to the bus bars, the one plug being hangable on the housing and its sets of plug-on jaws being receivable respectively through the openings in the insulator and through the access opening, and the mounting frame being hung on the housing and the hood with the insulator secured thereto being in its open position when it is desired to electrically connect the other plug to the bus bars, the other plug being hangable on the mounting frame and the end portions of its tie plates being receivable through the access opening.

9. An electrical distribution system as claimed in claim 8 wherein the joint structure of the other plug includes a plurality of pairs of tie plates and the clamping bolt clamps the bus bars respectively between end portions of the pairs of tie plates when the other plug is electrically connected to the bus bars.

References Cited
UNITED STATES PATENTS

| | | | |
|---|---|---|---|
| 2,161,571 | 6/1939 | Harvey | 339—22(B)X |
| 2,264,075 | 11/1941 | Frank | 339—22(B) |
| 2,960,674 | 11/1960 | Harton | 339—22(B)X |
| 3,148,008 | 9/1964 | Herrmann | 339—22(B) |
| 3,384,855 | 5/1968 | Jorgensen | 339—22(B) |

FOREIGN PATENTS

| | | | |
|---|---|---|---|
| 1,247,444 | 10/1960 | France | 339—22(B) |

MARVIN A. CHAMPION, Primary Examiner

T. P. LEWIS, Assistant Examiner

U.S. Cl. X.R.

174—88